United States Patent
Krukov et al.

(10) Patent No.: US 10,339,312 B2
(45) Date of Patent: Jul. 2, 2019

(54) SYSTEM AND METHOD FOR DETECTING MALICIOUS COMPOUND FILES

(71) Applicant: AO Kaspersky Lab, Moscow (RU)

(72) Inventors: Andrey V. Krukov, Moscow (RU); Alexander V. Liskin, Moscow (RU); Anton M. Ivanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 286 days.

(21) Appl. No.: 15/411,132

(22) Filed: Jan. 20, 2017

(65) Prior Publication Data
US 2018/0101682 A1 Apr. 12, 2018

(30) Foreign Application Priority Data
Oct. 10, 2016 (RU) .................................. 2016139470

(51) Int. Cl.
*G06F 21/56* (2013.01)
(52) U.S. Cl.
CPC .................................. *G06F 21/565* (2013.01)
(58) Field of Classification Search
CPC .................................................... G06F 21/565
See application file for complete search history.

(56) References Cited

U.S. PATENT DOCUMENTS

| | | | |
|---|---|---|---|
| 6,851,058 B1 * | 2/2005 | Gartside | G06F 21/577 726/24 |
| 8,695,096 B1 * | 4/2014 | Zhang | G06F 21/564 707/692 |
| 9,043,917 B2 * | 5/2015 | Zhang | G06F 21/564 726/24 |
| 9,230,111 B1 * | 1/2016 | Nanda | G06F 21/57 |
| 9,438,622 B1 * | 9/2016 | Staniford | H04L 63/1416 |
| 2006/0136553 A1 * | 6/2006 | Villaron | G06F 17/24 709/203 |

(Continued)

OTHER PUBLICATIONS

Gao et al.; Analyze and detect malicious code for compound document binary storage format; Published in: 2011 International Conference on Machine Learning and Cybernetics; Date of Conference: Jul. 10-13, 2011; IEEE Xplore (Year: 2011).*

(Continued)

*Primary Examiner* — Bradley W Holder
(74) *Attorney, Agent, or Firm* — Arent Fox LLP; Michael Fainberg

(57) ABSTRACT

A method and system is provided for detecting malicious compound files. An example method includes: obtaining at least one compound file; identifying a first set of features of the at least one compound file including features associated with a header of the at least one compound file; subsequent to identifying the first set of features, identifying, by the processor, a second set of features of the at least one compound file including features associated with at least one directory of the at least one compound file; determining a hash sum of the at least one compound file based on the first and second set of features; comparing the hash sum of the at least one compound file with information associated with a plurality of compound files stored in a database; and identifying the at least one compound file as being malicious, trusted or untrusted based at least on comparison results.

20 Claims, 4 Drawing Sheets

(56) References Cited

U.S. PATENT DOCUMENTS

| | | | | |
|---|---|---|---|---|
| 2013/0145466 A1* | 6/2013 | Richard | ............... | G06F 21/562 |
| | | | | 726/23 |
| 2013/0160127 A1* | 6/2013 | Jeong | ................... | G06F 21/566 |
| | | | | 726/24 |
| 2013/0305373 A1* | 11/2013 | Lim | ....................... | G06F 21/56 |
| | | | | 726/24 |
| 2014/0150101 A1* | 5/2014 | Chiu | .................... | G06F 21/562 |
| | | | | 726/22 |
| 2014/0150105 A1* | 5/2014 | Yu | ....................... | G06F 21/561 |
| | | | | 726/24 |
| 2014/0237597 A1* | 8/2014 | Zhang | .................. | G06F 21/564 |
| | | | | 726/23 |
| 2015/0178306 A1* | 6/2015 | Yang | ....................... | G06F 21/56 |
| | | | | 707/737 |
| 2015/0288707 A1* | 10/2015 | Liu | ...................... | H04L 63/145 |
| | | | | 726/24 |

OTHER PUBLICATIONS

Simske et al.; APEX: automated policy enforcement eXchange; Published in Proceeding DocEng '10 Proceedings of the 10th ACM symposium on Document engineering; pp. 139-142; Sep. 21-24, 2010; ACM Digital Library (Year: 2010).*

* cited by examiner

SYSTEM AND METHOD FOR DETECTING MALICIOUS COMPOUND FILES

CROSS-REFERENCE TO RELATED APPLICATIONS

The present application claims benefit of priority under 35 U.S.C. 119(a)-(d) to a Russian Application No. 2016139470 filed Oct. 10, 2016, which is incorporated by reference herein.

FIELD OF TECHNOLOGY

The present disclosure relates generally to the field of cybersecury, and more specifically to systems and methods for detection of malicious compound files.

BACKGROUND

Each day the number of malicious applications spreading on the Internet is becoming greater and greater. For the protection of computing devices against malicious applications, antivirus solutions are often used, employing one or more methods of detection, such as signature or heuristic analysis, to detect malicious applications such as those downloaded from the Internet.

Yet the methods of detection also have limitations and inadequacies: heuristic analysis may not be used for all types of files, and signature analysis may not be effective for detection of polymorphous malicious applications—applications executing the same commands, but differing in their content of corresponding files of the applications. Such polymorphous malicious applications (and, in particular, the files of these applications) are often created in an automated manner (for example, they are generated automatically): the creator of the malicious application generally uses special development means which can compile from a single source code of the malicious application an enormous number of malicious files, which will have a different file body (file content), yet the applications launched from such files will behave in the same way. Improving the quality of detection of such files by using antivirus solutions often relies on determining the similarity of such files (the resemblance of the files in terms of one of the metrics of similarity). It should be noted that such polymorphous malicious files include not only files of PE (Portable Executable) format, but also any other files whose format allows the embedding of malicious code in a file, which will be executed in one way or another, such as files of the Portable Document Format, Microsoft Compound File Binary (OLE2 files) or one of the Office Open XML formats (DOCX, PPTX and others).

Although the known approaches are directed at solving certain problems in the area of protection of computing devices, they may not tackle the problem of detection of malicious compound files or they do so with insufficient effectiveness. The present invention enables a more effective solution to the problem of detection of malicious compound files.

SUMMARY

Disclosed are systems and methods for detection of malicious compound files. An example method includes: obtaining at least one compound file; identifying a first set of features of the at least one compound file including features associated with a header of the at least one compound file; subsequent to identifying the first set of features, identifying, by the processor, a second set of features of the at least one compound file including features associated with at least one directory of the at least one compound file; determining a hash sum of the at least one compound file based on the first and second set of features; comparing the hash sum of the at least one compound file with information associated with a plurality of compound files stored in a database; and identifying the at least one compound file as being malicious, trusted or untrusted based at least on comparison results.

In one exemplary aspect, the information associated with the plurality of compound files stored in the database comprise: hash sums of the plurality of compound files indicating each compound file as being malicious, trusted or untrusted, and information relating to which of the plurality of compound files is used to determine the hash sum of the at least one compound file.

In one exemplary aspect, identifying the at least one compound file as being malicious, trusted or untrusted is based at least on comparing the hash sum of the at least one compound file to the hash sums of the plurality of compound files indicating each compound file as being malicious, trusted or untrusted.

In one exemplary aspect, the method further comprises: removing the at least one compound file or placing the at least one compound file in quarantine in response to identifying the at least one compound file as being malicious.

In one exemplary aspect, the at least one compound file includes a file of Microsoft Compound File Binary File Format (MS-CFB).

In one exemplary aspect, the features associated with the header of the at least one compound file comprise at least one of: a complete list of structure fields of the header of the at least one compound file, and structure fields of the header of the at least one compound file starting with a selected field.

In one exemplary aspect, the features associated with at least one directory of the at least one compound file comprise at least one of: a complete list of structure fields of directories of the at least one compound file, and features associated with one or more selected directories of the at least one compound file.

In one exemplary aspect, a system for detecting malicious compound files comprises: a processor of a computing device executing a plurality of modules to: obtain at least one compound file; identify a first set of features of the at least one compound file including features associated with a header of the at least one compound file; subsequent to identifying the first set of features, identify a second set of features of the at least one compound file including features associated with at least one directory of the at least one compound file; determine a hash sum of the at least one compound file based on the first and second set of features; compare the hash sum of the at least one compound file with information associated with a plurality of compound files stored in a database; and identify the at least one compound file as being malicious, trusted or untrusted based at least on comparison results.

In one exemplary aspect, a non-transitory computer readable medium storing thereon computer executable instructions for detecting malicious compound files, includes instructions for: obtaining, by a processor of a computing device, at least one compound file; identifying, by the processor, a first set of features of the at least one compound file including features associated with a header of the at least one compound file; subsequent to identifying the first set of features, identifying, by the processor, a second set of features of the at least one compound file including features associated with at least one directory of the at least one compound file; determining a hash sum of the at least one compound file based on the first and second set of features; comparing the hash sum of the at least one compound file with information associated with a plurality of compound files stored in a database; and identifying the at least one compound file as being malicious, trusted or untrusted based at least on comparison results.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
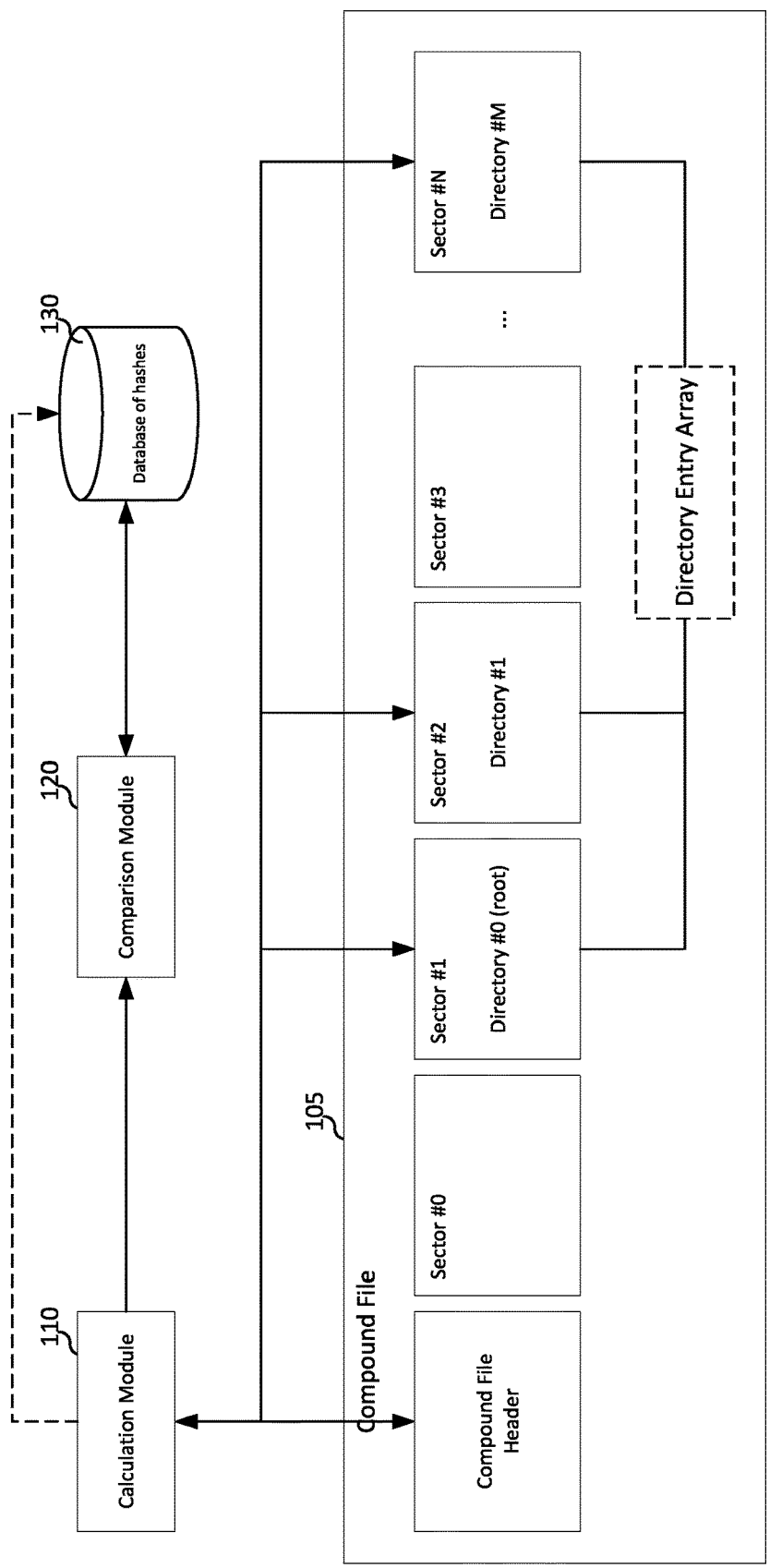
FIG. 1 shows an exemplary system for detection of malicious compound files, according to aspects of the present invention.

Example aspects on the invention are described herein in the context of a system, method and computer program product for blocking access to protected applications on a computing device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspect of the invention:

A malicious application may be an application with the ability to cause harm to a computer or to the data of the user of the computer, such as: an Internet worm, a keyboard tracker, a computer virus. The harm caused may be unlawful access to the resources of the computer, including the data being kept on the computer, for the purpose of theft, as well as unlawful use of the resources, including those for storage of data, performing computations, and so on.

A trusted application may be an application which does not cause harm to a computer or to its user. A trusted application can be taken to mean an application which has been developed by a trusted software manufacturer, downloaded from a trusted source (such as a site listed in a database of trusted sites) or an application whose identifier (e.g., the MD5 of the application file) is kept in a database of trusted applications. The identifier of the manufacturer, such as a digital certificate, may also be kept in the database of trusted applications.

An untrusted application may be an application which is not trusted, but also not recognized as harmful, for example with the aid of an antivirus application.

A malicious file may be a file which is a component of a malicious application.

An untrusted file may be a file which is a component of an untrusted application.

A trusted file may be a file which is a component of a trusted application.

Signature analysis may be the technology of finding correspondences between a particular segment of program code and a known code—signature—from a database of signatures of malicious programs with the goal of detecting a malicious program. It should be noted that this technology can be used both to detect files of a malicious program and to detect malicious code in the RAM of a computing device.

Heuristic analysis is a technology involving the emulating of the working of a program (executing of the program code, adapted for execution with the use of certain hardware and software, by using other hardware and software different from the former), creating a call log of application programming interface (API) functions, and finding correspondences between the data of the created call log of API functions with data from a database of emulations of malicious programs in order to detect a malicious program.

An antivirus record may be information needed by the antivirus application to detect malicious files. It may be, for example, in the form of a signature, a heuristic rule (which can be used, for example, by heuristic and proactive analysis), a check sum or hash of a file (including a flexible or locality-sensitive hash—a file hash which is invariant to minor file changes).

A compound file (container file) may be a file of Microsoft Compound File Binary File Format (MS-CFB), such as a file of OLE or OLE2 format. Examples of compound files can be files of the formats: DOC, PPT, XLS (on the Windows OS the files have the extensions .doc, .ppt and .xls respectively).

In one exemplary aspect, the system for detection of malicious compound files may include actual devices, systems, components, and groups of components realized with the use of hardware such as integrated microcircuits (application-specific integrated circuits, ASIC) or field-programmable gate arrays (FPGA) or, for example, in the form of a combination of hardware and software, such as a microprocessor system and a set of software instructions, and also one based on neurosynaptic chips. The functionality of the disclosed system may be realized exclusively by hardware, and also in the form of a combination where a portion of the functionality of the system is realized by software, and another portion by hardware. In certain variant embodiments, some or all of the disclosed functionalities may be implemented on a general-purpose computer processor (such as the one shown in FIG. 4). The components of the system may be realized in either a single computing device or spread out among several interconnected computing devices.

FIG. 1 shows an exemplary system for detection of malicious compound files. The system may include the following components: a calculation module 110, a comparison module 120 and a database of hashes 130. Specifically, the calculation module 110 may be deployed on the computing device of the user, while the comparison module 120 and the database of hashes 130 may be deployed on a remote server (not shown in FIG. 1). In yet another variant embodiment, the comparison module 120 and the database of hashes 130 may likewise be deployed on the computing device of the user.

In one exemplary aspect, the calculation module 110 may be configured to calculate a hash (hash sum) of the compound file 105. In the general case, the calculation module 110 may calculate the hash of a compound file 105 which may be part of a group of similar compound files, so that for each compound file from the group of similar compound files the value of this hash will coincide. In a particular embodiment, the compound files may be similar if the distance between compound files does not exceed a threshold value. The distance between files is a measure of similarity. For example, the distance between compound files may be the Euclidean distance, the Hemming distance, or any other metric of distance applied, for example, to the byte representation of the compound file or to blocks of bytes of a given size. In yet another particular embodiment, compound files may be similar if the coefficient of similarity between such files exceeds a threshold value. The coefficient of similarity may be Jaccard coefficient. In yet another particular embodiment, compound files may be similar if they are considered to be such by an expert in the field of information technologies.

In one exemplary aspect, compound files may be similar if they have been created by the application of automated file generation (creation) means to identical source data. An example of the use of such automated generation may be the creation of a group of compound files, such as documents of DOC format, on the basis of an identical text (the files created will contain identical text). Yet another example could be the creation of a group of malicious files of an application by using, for example, a development mean utilizing the identical source code of a malicious application. Such malicious files are also known as polymorphic (polymorph malware).

One characteristic of the use of the aforementioned automated generation means is that the files created from the identical source data may have a different byte representation, yet the payload remains unchanged. In a particular embodiment, the payload of a file may be the sequence of commands which are executed upon opening the file. In yet another particular instance, the payload of a file may include the information displayed to the user upon opening the file with an application designed to open such files. Accordingly, in a particular embodiment, the purpose of the calculation module 110 is to calculate the hashes of the compound files obtained by automated generation, so that the hashes of such generated files match up.

To calculate a hash satisfying the aforesaid condition (identical hash for similar files, such as generated files), the calculation module may 110 extract the file features from the compound file 105 in two steps.

In the first step, the calculation module 110 may identify from the compound file 105 a first set of features. The first set of features may be features associated with the header of the compound file 105 (the Compound File Header). The features located in the header of the compound file 105 in one particular embodiment may be the structure fields of the header of the compound file 105 in accordance with the specification of the Microsoft compound file binary (MS-CFB) file format. In a particular embodiment, the first set of features may be the complete list of structure fields of the header of the compound file 105 (such as the "Header Signature", "Minor Version", "Major Version" and other fields). In yet another particular embodiment, the first set of features may be all structure fields of the header of the compound file 105 starting with the "Number of FAT Sectors" field, which is located at offset 0x2C from the start of the header (the header field starting at offset 0x2C and ending at the end of the header of the compound file 105).

In the second step, the calculation module 110 may be configured to identify from the compound file 105 a second set of features. The second set of features may be features associated with at least one directory of the compound file 105 (Compound File Directory Entry). In one aspect, such features may be the complete list of structure fields of the directory of the compound file 105 (such as the "Directory Entry Name", "Color Flag" and other fields). In a particular embodiment of the invention, the second set of features may be features located in the first directory of the directory array of the compound file 105 (Compound File Directory Array). In yet another aspect of the invention, the second set of features may be features located in the first four directories (in order of the directory array) of the compound file 105 (Compound File Directory Array).

The results obtained in the above-described (first and second) steps may be used by the calculation module 110 to compute the hash of the compound file 105. In a particular embodiment, the calculation module 110 may compute the hash of the compound file 105 with the use of the first and second sets of features as follows: the byte representation (the concatenation of byte values of each feature from the set of features) of the first set of features is combined with the byte representation of the second set of features by means of a concatenation, resulting in the formation of the byte representation of the features of the compound file 105. In a particular embodiment, said byte representation of the features of the compound file 105 may be supplemented (by means of concatenation) with the size of the compound file 105 (the byte representation of the size value). A hash function may then be applied to the obtained byte representation of the features of the compound file 105. In a particular embodiment, MD5 may be used as the hash function. In yet another particular embodiment, SHA-0, SHA-1 or one of the hash functions of the AES family may be used. The value obtained after the application of the aforementioned hash function (e.g., the size of the obtained value is N bits) may be partitioned into two parts of equal size (in bits)—one part characterizing the first N/2 bits of the obtained value, and a second part characterizing the second N/2 bits of the value (for example, for the MD5 hash function, these parts will be the first and second 8 bytes of the value obtained by calculating the hash function). The calculation module 110 may apply the XOR logic operation to the two aforementioned parts. The result of the calculation of the XOR operation by the calculation module 110 is the hash of the compound file 105.

A characteristic of the hash of the compound file 105 computed in accordance with the above-described algorithm (identification of the features of the header of the compound file 105, as well as the features of the first four directories from the directory array of the compound file 105 with subsequent application of the hash function) is the fact that the hashes of the compound files 105 obtained by means of automated generation match up. This characteristic results from the fact that the compound files obtained by automated generation have a different byte representation of the content (specifically, the sectors of the compound files containing the file payload—the FAT, Mini FAT and DIFAT sectors), but the structure of such files as described by the directories of the compound files (the data kept in at least the first four directories of the directory array of the compound file) may be identical. The calculation of the hash by the aforementioned method may be a faster operation than the calculation of the file MD5, since even in the step of using MD5 (or analogous hash functions) the hash function is applied not to the entire body of the file, but only to data of small size.

The comparison module 120 may be configured to compare the hashes of the compound files 105. In one aspect of the invention, if the hashes of two compound files 105 being compared match up, the comparison module 120 may determine these compound files 105 as being similar. In yet another particular embodiment, if the hash of a compound file 105 (the hash of a first compound file 105), computed with the aid of the calculation module 110, matches up with the hash of a malicious compound file 105, then the first compound file 105 may be determined as being malicious. In yet another particular embodiment, if the hash of a compound file 105 (the hash of a first compound file 105), computed with the aid of the calculation module 110, matches up with the hash of a trusted compound file 105, then the first compound file 105 may be determined as being trusted. In yet another particular embodiment, if the hash of a compound file 105 (the hash of a first compound file 105), computed with the aid of the calculation module 110, matches up with the hash of an untrusted compound file 105, then the first compound file 105 is recognized as being untrusted. The hashes of malicious, trusted and untrusted compound files are stored in the database of hashes 130.

Figure 2:
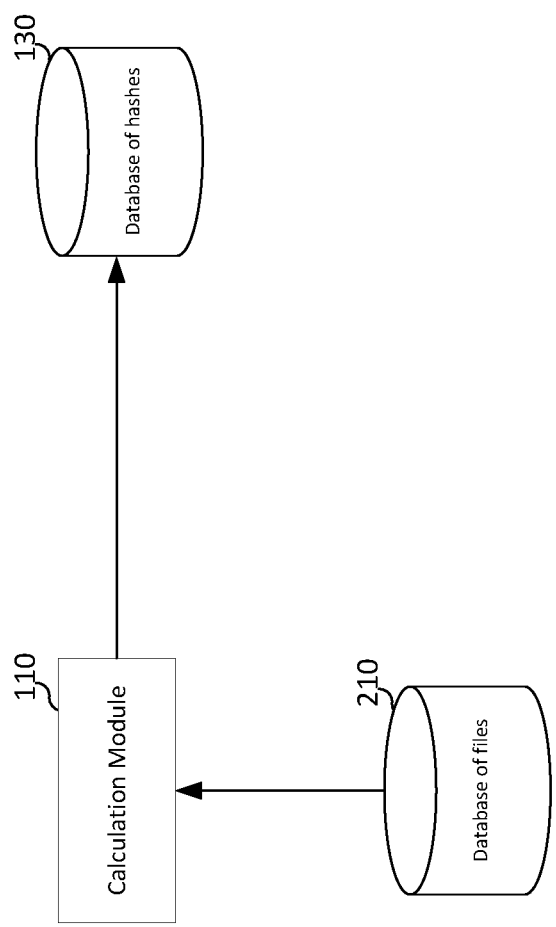
FIG. 2 illustrates exemplary elements of the system which are involved in the formation of a database of hashes according to aspects of the present invention.

FIG. 2 illustrates exemplary elements of the system which are involved in the formation of a database of hashes. The database of hashes 130 may be configured to store the hashes of compound files 105, as well as information as to which compound file 105 was used to calculate the hash of the compound file 105. Said information about the compound file 105 may include whether or not it is malicious, trusted, or untrusted. Thus, if during the calculation of the hash of a compound file 105 a malicious compound file from the database of files 210 was used, the obtained hash will be called the hash of a malicious compound file 105. If during the calculation of the hash of a compound file 105 a trusted compound file 105 from the database of files 210 was used, the obtained hash will be called the hash of a trusted compound file 105. If during the calculation of the hash of a compound file 105 an untrusted compound file 105 from the database of files 210 was used, the obtained hash will be called the hash of an untrusted compound file 105. For the calculation of the hashes of compound files 105 the calculation module 110 uses compound files 105 from the database of files 210. The database of files 210 contains compound files 105, as well as information about each compound file 105—whether it is malicious, trusted or untrusted. In a particular embodiment of the invention, the data (compound files and the information about them) which is stored in the database of files 210 is entered into the database of files 210 by a person, such as an expert in the field of information technologies. In yet another particular embodiment of the invention, the data may be stored in the database of files 210 by an antivirus application (not shown in FIG. 2), which may analyze the set of compound files, such as the compound files stored on a remote server, with the goal of detecting malicious compound files, and writing into the database of files 210 the files and information about them obtained as a result of the analysis—for example, whether they are malicious, trusted or untrusted. The calculation module 110 may obtain from the database of files 210 the compound file 105 and information about it, calculate for this compound file 105 the hash of the compound file 105 and save the obtained information in the database of hashes 130: the hash of the compound file 105 and information about the file 105 that was used to calculate the hash.

In another exemplary aspect, filling up the database of hashes 130 by the aforementioned method may occur before the steps disclosed in the description of FIG. 1.

Figure 3:
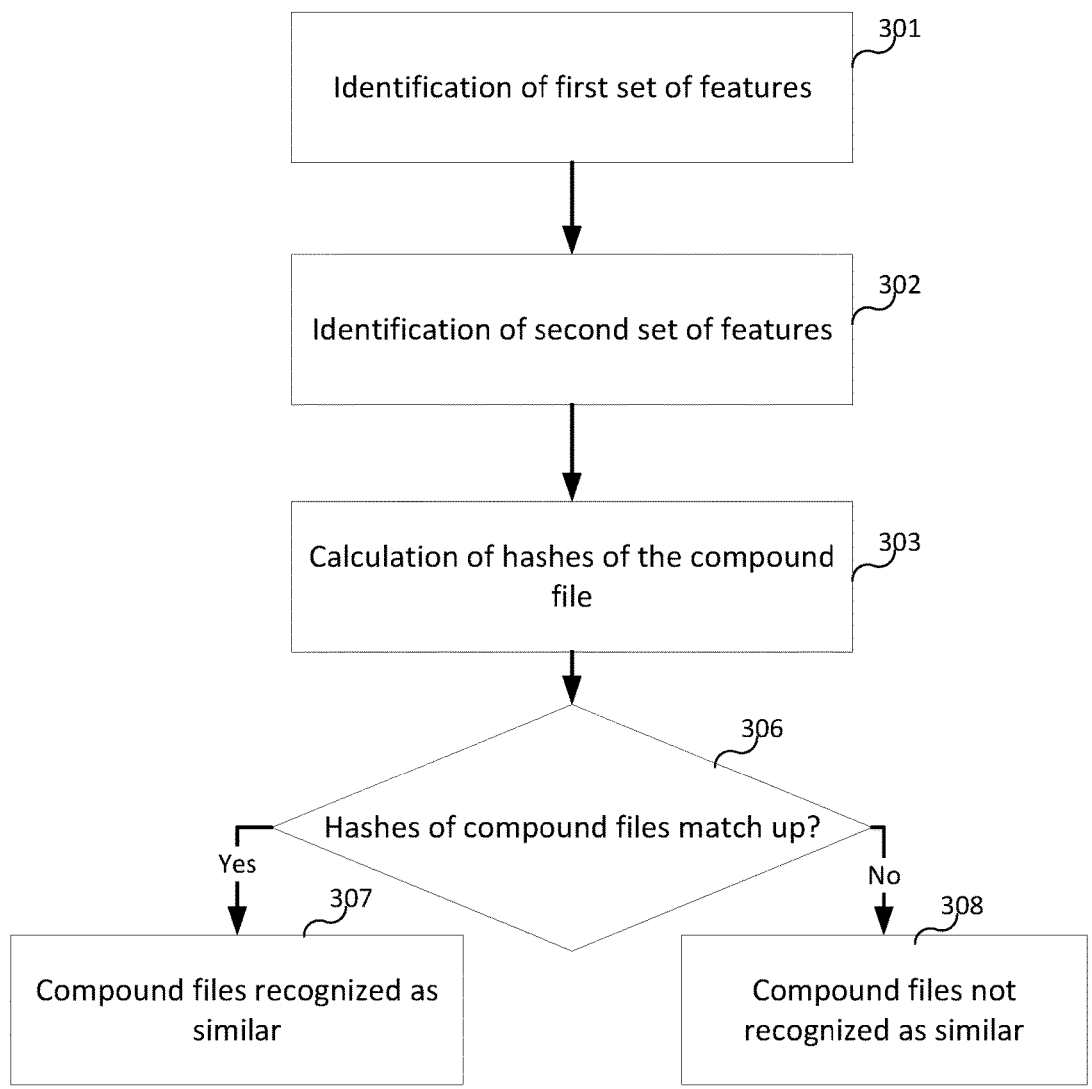
FIG. 3 illustrates a flow chart of an exemplary method for detection of malicious compound files, according to aspects of the present invention.

FIG. 3 shows an example method of detecting a malicious compound file 105 in accordance with aspects of the invention. In step 301, the calculation module 110 may identify from the compound file 105 a first set of features from the compound file 105. In a particular embodiment, said compound file 105 may be any one of the compound files 105 stored, for example, on a data storage device residing on the computing device of the user. In yet another particular embodiment, the information about this compound file 105 is not stored in the database of files 210. In certain circumstances, it is assumed that it is not known with regard to such a compound file 105 whether it is similar to files from the database of files 210 or whether it is malicious, trusted or untrusted. In step 302, the calculation module 110 may identify from the compound file 105 the second set of features of the compound file 105. Then, in step 303, the calculation module 110 may compute the hash of the compound file 105 on the basis of the first and second set of features of the compound file 105. In step 306, the comparison module 120 may compare the calculated hash of the compound file 105 with the hash of a second compound file. The compound file 105 whose hash was calculated in step 303 may be called the first compound file 105, and accordingly its hash may be called the hash of the first compound file 105. In one aspect, the hash of the second compound file 105 may be calculated by performing steps 301-303 in relation to the second compound file 105. Further, the second compound file 105 may be any of the compound files 105 stored, for example, on a data storage device on the computing device of the user and may be different from the first compound file 105 (e.g., at least a difference in the file location directories on the data storage device). In yet another particular embodiment, the second compound file 105 may be a file whose hash and information about which (such as whether the compound file is malicious or trusted) is stored in the database of hashes 130 (the file may be present in the database of files 210). If the hashes of the first and second compound files 105 match up, the comparison module 120 in step 307 may determine the first and second compound files 105 as being similar. If the hash of the second compound file 105 is stored in the database of hashes 130 and is the hash of a malicious compound file 105, then the first compound file 105 may be determined as being malicious. In yet another particular embodiment, if the hash of the second compound file 105 is stored in the database of hashes 130 and is the hash of a trusted compound file 105, then the first compound file 105 may be determined as being trusted. In yet another particular embodiment, if the hash of the second compound file 105 is stored in the database of hashes 130 and is the hash of an untrusted compound file 105, then the first compound file 105 is recognized as being untrusted. But if the hashes of the first and second compound files 105 do not match up, then the comparison module 120 in step 308 may not determine the first and second compound files 105 as being similar.

In one exemplary aspect, after identifying the compound file 105 as being malicious, the comparison module 120 may remove the compound file 105 on the data storage device residing on the computing device of the user. In yet another particular embodiment, the comparison module 130 may not remove the malicious compound file 105, but place it in quarantine.

In one exemplary aspect, the system of the present invention may further include an application control means, which upon accessing compound files 105 on the computing devices of the users will send a compound file to the calculation module 110, which may calculate the hash of the compound file 105. This hash is then compared by the comparison module 120 with the hashes of compound files from the database of hashes 130. The results of the comparison—whether the corresponding hash is present in the database 130, and also information as to whether the hash found (if any) is the hash of a malicious, trusted, or untrusted compound file 105—may be sent by the comparison module 120 to the application control means. The application control means may allow the user of the computing device to access the aforesaid compound file 105 only if the comparison module 120 has found the computed hash of the compound file 105 in the database of hashes 130 and the hash found is the hash of a trusted compound file 105.

In yet another exemplary aspect, the hashes of compound files 105 obtained with the aid of the calculation module 110 can be used in the context of the technology described in patent RU2415471—to determine the need to perform an antivirus scan of the compound file. In this case, the hashes of compound file 105 obtained with the aid of the calculation module 110 are used to determine changes in the compound files 105. Accordingly, during the next antivirus scan, which is done for example by an antivirus application (such as a scanning of a data storage device in order to find malicious files), the calculation module 110 may calculate the hash of each compound file 105 scanned (by the antivirus application). If during the next antivirus scan the antivirus application begins a scanning of the compound file 105 and its hash matches up with the previously calculated hash (calculated during the previous antivirus scan), no scanning will be done in regard to this compound file 105, i.e., there is no need for an antivirus scan (scanning of the file by the antivirus application).

In one exemplary aspect, the calculation module 110 may obtain any given file (not necessarily a compound file 105) in the context of any functioning variant (at entry, as input data). In such a case, prior to identifying the sets of features of the compound file 105, the calculation module 110 may determine the format of the file obtained by the calculation module 110. The further identifying of the sets of features may be done by the calculation module 110 only in the event that the calculation module 110 determines that the file obtained by the calculation module 110 is a compound file. In a particular embodiment of the invention, the determination of whether the obtained file is a compound file or not may be done on the basis of data from the file: if the file starts with the byte sequence "d0 cf 11 e0 a1 b1 1a e1" or "0e 11 fc 0d d0 cf 11 0e", the file may be considered to be a compound file. In another particular embodiment, any of the methods of determination of a compound file that are known from the prior art can be used to determine whether the file is a compound file.

Figure 4:
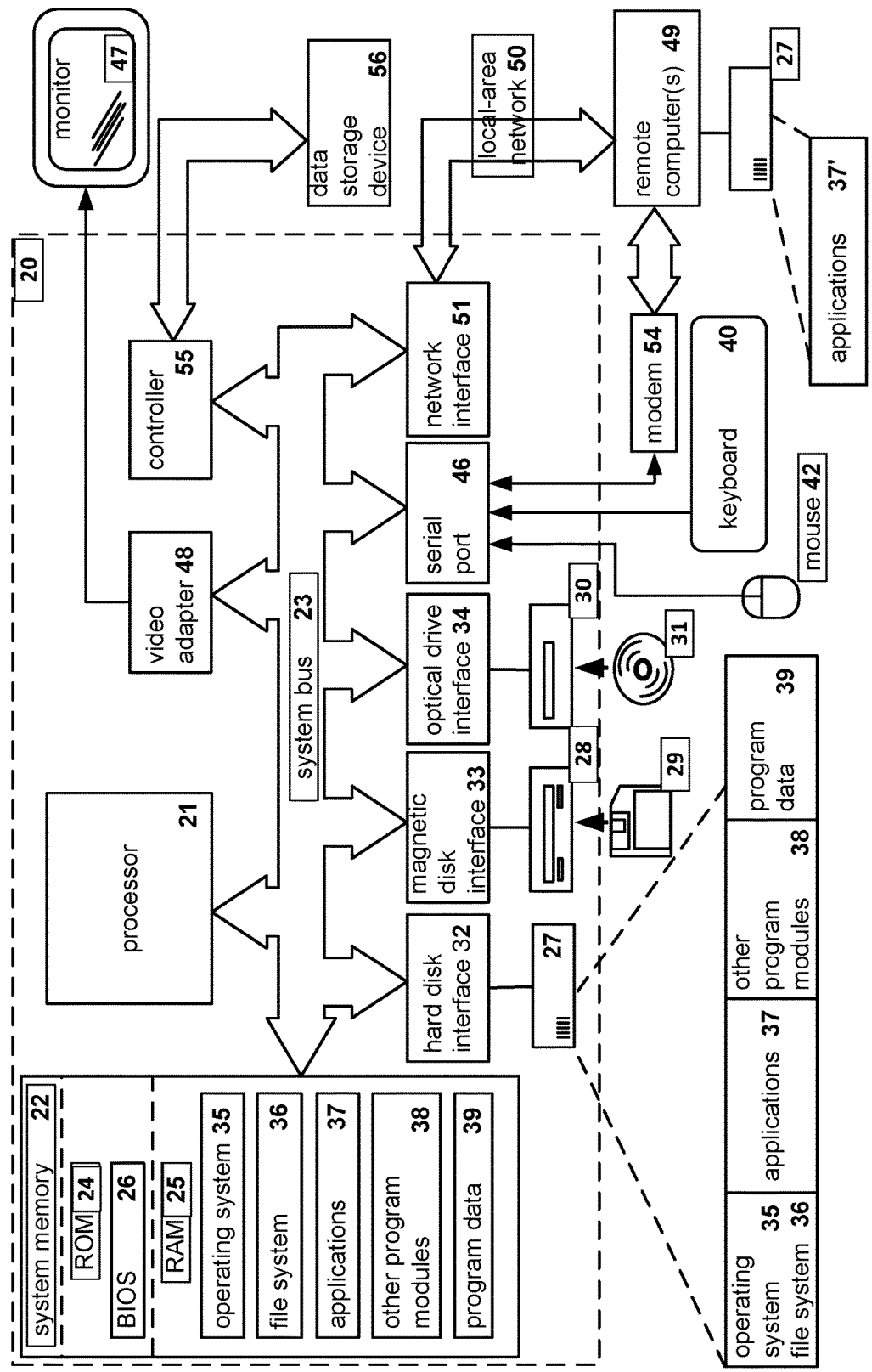
FIG. 4 shows an example of a general-purpose computer system on which the aspects of the systems and methods for detection of malicious compound files can be implemented

FIG. 4 is a diagram illustrating a general-purpose computer system on which aspects of systems and methods for detection of malicious compound files may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may be permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIGS. 1 and 2, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting malicious compound files, the method comprising:
   obtaining, by a processor of a computing device, at least one compound file;
   identifying, by the processor, a first set of features of the at least one compound file including features associated with a header of the at least one compound file;
   subsequent to identifying the first set of features, identifying, by the processor, a second set of features of the at least one compound file including features associated with at least one directory of the at least one compound file;
   determining a hash of the at least one compound file based on the first and second set of features by concatenating byte representations of the first set of features with byte representations of the second set of features and byte representations of a size of the compound file;
   comparing the hash of the at least one compound file with information associated with a plurality of compound files stored in a database; and
   identifying the at least one compound file as being malicious, trusted or untrusted based at least on comparison results.

2. The method of claim 1, wherein the information associated with the plurality of compound files stored in the database comprise:
   hashes of the plurality of compound files indicating each compound file as being malicious, trusted or untrusted, and
   for each hash stored in the database, information relating to which of the plurality of compound files is used to determine the hash of the at least one compound file.

3. The method of claim 2, wherein the identifying the at least one compound file as being malicious, trusted or untrusted is based at least on comparing the hash of the at least one compound file to the hashes of the plurality of compound files indicating each compound file as being malicious, trusted or untrusted.

4. The method of claim 1, further comprising removing the at least one compound file or placing the at least one compound file in quarantine in response to identifying the at least one compound file as being malicious.

5. The method of claim 1, wherein the at least one compound file includes a file of Microsoft Compound File Binary File Format (MS-CFB).

6. The method of claim 1, wherein the features associated with the header of the at least one compound file comprise at least one of: a complete list of structure fields of the header of the at least one compound file, and structure fields of the header of the at least one compound file starting with a selected field.

7. The method of claim 1, wherein the features associated with at least one directory of the at least one compound file comprise at least one of: a complete list of structure fields of directories of the at least one compound file, and features associated with one or more selected directories of the at least one compound file.

8. A system for detecting malicious compound files, the system comprising:
   at least one hardware processor configured to:

obtain at least one compound file;
identify a first set of features of the at least one compound file including features associated with a header of the at least one compound file;
subsequent to identifying the first set of features, identify a second set of features of the at least one compound file including features associated with at least one directory of the at least one compound file;
determine a hash of the at least one compound file based on the first and second set of features by concatenating byte representations of the first set of features with byte representations of the second set of features and byte representations of a size of the compound file;
compare the hash of the at least one compound file with information associated with a plurality of compound files stored in a database; and
identify the at least one compound file as being malicious, trusted or untrusted based at least on comparison results.

9. The system of claim 8, wherein the information associated with the plurality of compound files stored in the database comprise:
hashes of the plurality of compound files indicating each compound file as being malicious, trusted or untrusted, and
for each hash stored in the database, information relating to which of the plurality of compound files is used to determine the hash of the at least one compound file.

10. The system of claim 9, wherein a configuration to identify the at least one compound file as being malicious, trusted or untrusted, comprises a configuration of the at least one hardware processor to compare the hash of the at least one compound file to the hashes of the plurality of compound files indicating each compound file as being malicious, trusted or untrusted.

11. The system of claim 8, wherein the at least one hardware processor is further configured to remove the at least one compound file or place the at least one compound file in quarantine in response to identifying the at least one compound file as being malicious.

12. The system of claim 8, wherein the at least one compound file includes a file of Microsoft Compound File Binary File Format (MS-CFB).

13. The system of claim 8, wherein the features associated with the header of the at least one compound file comprise at least one of: a complete list of structure fields of the header of the at least one compound file, and structure fields of the header of the at least one compound file starting with a selected field.

14. The system of claim 8, wherein the features associated with at least one directory of the at least one compound file comprise at least one of: a complete list of structure fields of directories of the at least one compound file, and features associated with one or more selected directories of the at least one compound file.

15. A non-transitory computer readable medium storing thereon computer executable instructions for detecting malicious compound files, including instructions for:
obtaining, by a processor of a computing device, at least one compound file;
identifying, by the processor, a first set of features of the at least one compound file including features associated with a header of the at least one compound file;
subsequent to identifying the first set of features, identifying, by the processor, a second set of features of the at least one compound file including features associated with at least one directory of the at least one compound file;
determining a hash of the at least one compound file based on the first and second set of features by concatenating byte representations of the first set of features with byte representations of the second set of features and byte representations of a size of the compound file;
comparing the hash of the at least one compound file with information associated with a plurality of compound files stored in a database; and
identifying the at least one compound file as being malicious, trusted or untrusted based at least on comparison results.

16. The computer readable medium of claim 15, wherein the information associated with the plurality of compound files stored in the database comprise:
hashes of the plurality of compound files indicating each compound file as being malicious, trusted or untrusted, and
for each hash stored in the database, information relating to which of the plurality of compound files is used to determine the hash of the at least one compound file.

17. The computer readable medium of claim 15, wherein the instructions for the identifying of the at least one compound file as being malicious, trusted or untrusted comprise instructions for comparing the hash of the at least one compound file to the hashes of the plurality of compound files indicating each compound file as being malicious, trusted or untrusted.

18. The computer readable medium of claim 15, further comprising instructions for removing the at least one compound file or placing the at least one compound file in quarantine in response to identifying the at least one compound file as being malicious.

19. The computer readable medium of claim 15, wherein the at least one compound file includes a file of Microsoft Compound File Binary File Format (MS-CFB).

20. The computer readable medium of claim 15, wherein the features associated with the header of the at least one compound file comprise at least one of: a complete list of structure fields of the header of the at least one compound file, and structure fields of the header of the at least one compound file starting with a selected field, and wherein the features associated with at least one directory of the at least one compound file comprise at least one of: a complete list of structure fields of directories of the at least one compound file, and features associated with one or more selected directories of the at least one compound file.

* * * * *